United States Patent
Miller

(10) Patent No.: US 8,816,143 B2
(45) Date of Patent: *Aug. 26, 2014

(54) FUEL AND BASE OIL BLENDSTOCKS FROM A SINGLE FEEDSTOCK

(75) Inventor: Stephen J. Miller, San Francisco, CA (US)

(73) Assignee: Chevron U.S.A. Inc., San Ramon, CA (US)

(*) Notice: Subject to any disclaimer, the term of this patent is extended or adjusted under 35 U.S.C. 154(b) by 935 days.

This patent is subject to a terminal disclaimer.

(21) Appl. No.: 12/914,759

(22) Filed: Oct. 28, 2010

(65) Prior Publication Data

US 2012/0108871 A1   May 3, 2012

(51) Int. Cl.
C07C 1/00 (2006.01)

(52) U.S. Cl.
USPC ............ 585/240; 585/14; 44/605; 44/606; 44/303

(58) Field of Classification Search
CPC ............ C10G 3/00; C10G 2300/1018; C10G 2300/1048; C10G 2300/1062; C10G 2300/1037; C07C 2/04; Y02E 50/00; Y02E 5/13; G10G 2300/1011
USPC ............ 585/240, 242, 733, 14; 44/606, 605
See application file for complete search history.

(56) References Cited

U.S. PATENT DOCUMENTS

| | | |
|---|---|---|
| 2,360,844 A | 10/1944 | Bradshaw et al. |
| 2,383,632 A | 8/1945 | Trent |
| 2,383,633 A | 8/1945 | Trent |
| 2,793,219 A | 5/1957 | Barrett et al. |
| 2,793,220 A | 5/1957 | Barrett et al. |
| 3,422,124 A | 1/1969 | Stamford et al. |
| 3,632,822 A | 1/1972 | Conroy |
| RE32,241 E | 9/1986 | Saxer |
| 4,776,983 A | 10/1988 | Hayes |
| 4,792,418 A | 12/1988 | Rubin et al. |

(Continued)

FOREIGN PATENT DOCUMENTS

| | | | |
|---|---|---|---|
| WO | WO 2007/003708 | * | 1/2007 |
| WO | WO 2007144473 | * | 12/2007 |
| WO | 2010/011744 | | 1/2010 |

OTHER PUBLICATIONS

PCT/US2011/052901 International Search Report mailed Apr. 24, 2012.

(Continued)

Primary Examiner — Nina Bhat
(74) Attorney, Agent, or Firm — Terrence M Flaherty

(57) ABSTRACT

A method comprising providing a fatty acyl mixture comprising: (i) a $C_{10}$-$C_{16}$ acyl carbon atom chain content of at least 30 wt. % wherein at least 80% of the $C_{10}$-$C_{16}$ acyl carbon atom chains are saturated; and (ii) a $C_{18}$-$C_{22}$ acyl carbon atom chain content of at least 20 wt. % wherein at least 50% of the acyl $C_{18}$-$C_{22}$ carbon atom chains contain at least one double bond; hydrolyzing the mixture to yield a quantity of $C_{10}$-$C_{16}$ saturated fatty acids and $C_{18}$-$C_{22}$ unsaturated fatty acids; oligomerizing at least some of the $C_{18}$-$C_{22}$ unsaturated fatty acids to yield a quantity of $C_{36+}$ fatty acid oligomers; hydrotreating at least some of the $C_{10}$-$C_{16}$ saturated fatty acids and at least some of the $C_{36+}$ fatty acid oligomers to yield a quantity of diesel fuel blendstock and $C_{36+}$ alkanes; and separating at least some of the diesel fuel blendstock from the $C_{36+}$ alkanes.

10 Claims, 1 Drawing Sheet

(56) References Cited

U.S. PATENT DOCUMENTS

| | | | |
|---|---|---|---|
| 4,859,312 A | 8/1989 | Miller | |
| 4,992,605 A * | 2/1991 | Craig et al. | 585/240 |
| 5,158,665 A | 10/1992 | Miller | |
| 5,300,210 A | 4/1994 | Zones et al. | |
| 5,705,722 A * | 1/1998 | Monnier et al. | 585/240 |
| 6,204,426 B1 | 3/2001 | Miller et al. | |
| 6,630,066 B2 | 10/2003 | Cash et al. | |
| 6,723,889 B2 | 4/2004 | Miller et al. | |
| 6,841,063 B2 | 1/2005 | Elomari | |
| 7,754,931 B2 * | 7/2010 | Monnier et al. | 585/240 |
| 7,815,694 B2 * | 10/2010 | Miller | 44/308 |
| 7,960,597 B2 * | 6/2011 | Miller | 585/240 |
| 7,967,973 B2 * | 6/2011 | Myllyoja et al. | 208/64 |
| 8,198,223 B2 * | 6/2012 | Bloom | 508/496 |
| 8,278,492 B2 * | 10/2012 | Myllyoja et al. | 585/240 |
| 2006/0252660 A1 | 11/2006 | Duggal et al. | |
| 2007/0010682 A1 | 1/2007 | Myllyoja et al. | |
| 2007/0131579 A1 * | 6/2007 | Koivusalmi et al. | 208/19 |
| 2007/0260102 A1 * | 11/2007 | Duarte Santiago et al. | 585/733 |
| 2008/0163543 A1 * | 7/2008 | Abhari et al. | 44/308 |
| 2009/0029446 A1 | 1/2009 | O'Rear | |
| 2009/0084026 A1 * | 4/2009 | Miller | 44/308 |
| 2009/0088351 A1 | 4/2009 | Miller | |
| 2010/0018108 A1 | 1/2010 | Miller | |
| 2010/0018109 A1 | 1/2010 | Miller | |
| 2010/0140136 A1 | 6/2010 | Spilker et al. | |
| 2010/0187481 A1 | 7/2010 | Bodesheim et al. | |
| 2010/0234654 A1 | 9/2010 | Wang et al. | |
| 2012/0102827 A1 | 5/2012 | Miller | |
| 2012/0102828 A1 | 5/2012 | Miller | |
| 2012/0108869 A1 | 5/2012 | Miller | |
| 2012/0108870 A1 | 5/2012 | Miller | |

OTHER PUBLICATIONS

R. Baum, "Microalgae are Possible Source of Biodiesel Fuel," Chem. & Eng. News, 72 (14), 28-29 (1994).

N.O.V. Sonntag, "Fat Splitting," J. Am. Oil Chem. Soc., 56 (II), 729A-732A, (1979).

N.O.V. Sonntag, "New Developments in the Fatty Acid Industry," J. Am. Oil Chem. Soc., 56 (II), 861A-864A, (1979).

V.J. Muckerheide, Industrial Production of Fatty Acids: Fatty Acids; Their Chemistry, Properties, Production and Uses, Part 4, 2nd ed., Interscience Publishers, 2679-2702 (1967).

M.W. Linfield, R.A. Barauskas, L. Sivieri, S. Serota, and R.W. Stevenson, "Enzymatic Fat Hydrolysis and Synthesis," J. Am. Oil Chem. Soc., 61, 191-195 (1984).

M.S. Rana, V. Samano, J. Ancheyta, and J.A.I. Diaz, "A Review of Recent Advances on Process technologies for Upgrading of Heavy Oils and Residua," Fuel, 86, 1216-1231, (2007).

* cited by examiner

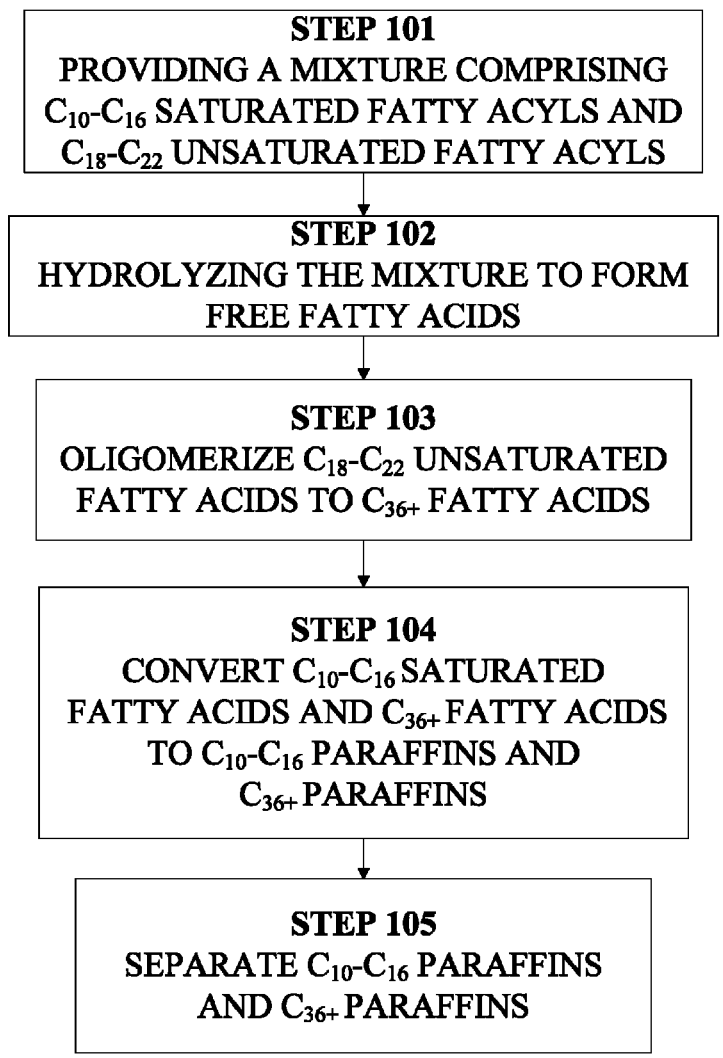

FUEL AND BASE OIL BLENDSTOCKS FROM A SINGLE FEEDSTOCK

TECHNICAL FIELD

The invention relates generally to methods for making transportation fuel and base oil blendstocks from biomass-derived compositions.

BACKGROUND

Transportation fuel and base oil blendstocks produced from biomass are of increasing interest since they are derived from renewable resources and may provide an attractive alternative and/or supplement to similar petroleum-derived products. Conventional processes for producing fuel and base oil blendstocks from biomass often employ separate fuel and base oil trains requiring duplicate reactors (and associated equipment) and the production of fuels has typically required a hydroisomerization step.

Conventional approaches for converting vegetable oils or other fatty acid derivatives into transportation fuels may comprise transesterification, catalytic hydrotreatment, hydrocracking, catalytic cracking without hydrogen, and thermal cracking, among others.

Triglycerides may be transesterified to produce a fatty acid alkyl ester, most commonly a fatty acid methyl ester (FAME). Conventional FAME is primarily composed of methyl esters of $C_{18+}$ saturated fatty acids. The poor low temperature properties of conventional FAME however have limited its wider use in regions with colder climatic conditions. Generally, the introduction of at least one double bond into the FAME molecule is needed in order to improve its low temperature properties. However, FAME molecules derived from unsaturated fatty acids contribute to poor oxidation stability of the fuel and to deposit formation.

Triglycerides may be hydrotreated to conventionally produce a normal $C_{18+}$ paraffin product. However, the poor low temperature properties of the normal $C_{18+}$ paraffin product limit the amount of product that can be blended in conventional diesel fuels in the summer time and prevent its use during the winter time. The normal $C_{18+}$ paraffinic product may be further isomerized to a $C_{18+}$ isoparaffinic product in order to lower the pour point.

There is a need to develop methods for efficiently processing, often simultaneously, biomass-derived compositions into a broader range of lubricants and fuel types having improved low temperature properties wherein the lubricants and fuels may be produced with reduced capital equipment requirements and with reduced hydrogen consumption.

SUMMARY OF THE INVENTION

In one embodiment, the invention relates to a method comprising the steps of providing a fatty acyl mixture comprising: (i) a $C_{10}$-$C_{16}$ acyl carbon atom chain content of at least 30 wt. % wherein at least 80% of the $C_{10}$-$C_{16}$ acyl carbon atom chains are saturated; and (ii) a $C_{18}$-$C_{22}$ acyl carbon atom chain content of at least 20 wt. % wherein at least 50% of the acyl $C_{18}$-$C_{22}$ carbon atom chains contain at least one double bond; hydrolyzing at least some of the mixture to yield a quantity of $C_{10}$-$C_{16}$ saturated fatty acids and $C_{18}$-$C_{22}$ unsaturated fatty acids; oligomerizing at least some of the $C_{18}$-$C_{22}$ unsaturated fatty acids to yield a quantity of $C_{36+}$ fatty acid oligomers; hydrotreating at least some of the $C_{10}$-$C_{16}$ saturated fatty acids and at least some of the $C_{36+}$ fatty acid oligomers to yield a quantity of diesel fuel blendstock and $C_{36+}$ alkanes; and separating at least some of the diesel fuel blendstock from the $C_{36+}$ alkanes.

The foregoing has outlined rather broadly the features of the invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the invention, and the advantages thereof, reference is now made to the following descriptions taken in conjunction with the accompanying drawing, in which:

FIG. 1 depicts a process flow diagram of an embodiment of the invention.

DETAILED DESCRIPTION

The following terms will be used throughout the specification and will have the following meanings unless otherwise indicated.

The term "biologically-derived oil" refers to any triglyceride-containing oil that is at least partially derived from a biological source such as, but not limited to, crops, vegetables, microalgae, animals and combinations thereof. Such oils may further comprise free fatty acids. The biological source is henceforth referred to as "biomass." For more on the advantages of using microalgae as a source of triglycerides, see R. Baum, "Microalgae are Possible Source of Biodiesel Fuel," *Chem. & Eng. News*, 72, 28-29 (1994).

The term "fatty acyl" refers to a generic term for describing fatty acids, their conjugates and derivatives, including esters, and combinations thereof. Fatty acyls encompass the esters derived from the reaction of fatty acids with alcohols. These esters may include fatty acid alkyl esters, such as fatty acid methyl esters, and fatty acid esters of glycerol, such as mono, di, and triglycerides. In the triglycerides, the three hydroxyl groups of glycerol are esterified.

The term "fatty acid" refers to a class of organic acids, having between 4 and 24 carbon atoms, of the general formula:

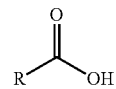

wherein R is generally a saturated (alkyl)hydrocarbon chain or a mono- or poly-unsaturated (alkenyl or olefinic) hydrocarbon chain.

The term "acyl carbon atom chain" denotes the —C(=O)R group, wherein R is as defined above. Thus, for example, lauric acid which has the structure

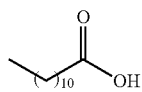

may be described as having a $C_{12}$ acyl carbon atom chain.

The term "triglyceride" refers to a class of molecules having the following molecular structure:

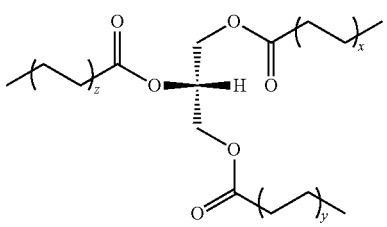

where x, y, and z can be the same or different, and wherein one or more of the branches defined by x, y, and z can have unsaturated regions.

The term "oligomerization" refers to the additive reaction of like or similar molecules (i.e., "mers") to form a larger molecule. For example, unsaturated fatty acids can react or combine via the double bonds in their structures. When two such species combine to form a larger molecule, the resulting species is termed a "dimer." When, for example, the aforementioned fatty acid components contain multiple regions of unsaturation, oligomers comprised of three or more mers are possible (e.g., "trimers").

The term "hydroprocessing" refers to processes wherein a hydrocarbon-based material reacts with hydrogen, typically under pressure and with a catalyst (hydroprocessing can be non-catalytic). Such processes include, but are not limited to, hydrodeoxygenation (of oxygenated species), hydrotreating, hydrocracking, hydroisomerization, and hydrodewaxing. Examples of such processes are disclosed in U.S. Pat. No. 6,630,066 and U.S. Pat. No. 6,841,063. Embodiments of the invention utilize such hydroprocessing to convert fatty acyls to paraffins. The terms "hydroprocessing" and "hydrotreating" are used interchangeably herein.

The term "hydroisomerization" refers to a process in which a normal paraffin is converted at least partially into an isoparaffin by the use of hydrogen and a catalyst. Isomerization dewaxing catalysts are representative catalysts used in such processes (see U.S. Pat. No. 5,300,210; U.S. Pat. No. 5,158,665; and U.S. Pat. No. 4,859,312).

The term "transportation fuels" refers to hydrocarbon-based fuels suitable for consumption by vehicles. Such fuels include, but are not limited to, diesel, gasoline, jet fuel and the like.

The term diesel fuel refers to hydrocarbons having boiling points in the range of from 350° F. to 700° F. (177° C. to 371° C.).

The term "base oil" refers a hydrocarbon fluid having a kinematic viscosity at 100° C. between 1.5 and 74.9 mm$^2$/s. It is a hydrocarbon fluid to which other oils or substances may be added to produce a lubricant. Base oils are generally classified by the American Petroleum Institute (API Publication Number 1509, Appendix E) into one of five general categories: Group I base oils contain <90% saturates and/or >0.03% sulfur and have a viscosity index ≥80 and <120; Group II base oils contain ≥90% saturates and ≤0.03% sulfur and have a viscosity index ≥80 and <120; Group III base oils contain ≥90% saturates and ≤0.03% sulfur and have a viscosity index ≥120; Group IV base oils are polyalphaolefins; Group V base oils include all other base oils not included in Group I, II, III, or IV.

The term "cloud point" refers to the temperature of a liquid when the smallest observable cluster of hydrocarbon crystals first occurs upon cooling under prescribed conditions (see ASTM D2500).

The term "$C_n$" refers to a hydrocarbon or hydrocarbon-containing molecule or fragment (e.g., an alkyl or alkenyl group) wherein "n" denotes the number of carbon atoms in the fragment or molecule irrespective of linearity or branching. The term "$C_{36+}$" refers to a hydrocarbon or hydrocarbon-containing molecule or fragment having 36 or more carbon atoms in the molecule or fragment.

1. Compositions: In one embodiment, the invention relates to providing a fatty acyl mixture comprising: a $C_{10}$-$C_{16}$ acyl carbon atom chain content of at least 30 wt. % wherein at least 80% of the $C_{10}$-$C_{16}$ acyl carbon atom chains are saturated; and a $C_{18}$-$C_{22}$ acyl carbon atom chain content of at least 20 wt. % wherein at least 50% of the acyl $C_{18}$-$C_{22}$ carbon atom chains contain at least one double bond.

In a first sub-embodiment, the fatty acyl mixture has a $C_{10}$-$C_{16}$ acyl carbon atom chain content of at least 40 wt. %; in a second sub-embodiment, a $C_{10}$-$C_{16}$ acyl carbon atom chain content of at least 50 wt. %; in a third sub-embodiment, a $C_{10}$-$C_{16}$ acyl carbon atom chain content of at least 60 wt. %; in a fourth sub-embodiment, a $C_{10}$-$C_{16}$ acyl carbon atom chain content of at least 70 wt. %; in a fifth sub-embodiment, a $C_{10}$-$C_{16}$ acyl carbon atom chain content of no more than 80 wt. %.

In a sixth sub-embodiment, the fatty acyl mixture has a $C_{18}$-$C_{22}$ acyl carbon atom chain content of at least 30%; in seventh sub-embodiment, a $C_{18}$-$C_{22}$ acyl carbon atom chain content of at least 40 wt. %; in an eighth sub-embodiment, a $C_{18}$-$C_{22}$ acyl carbon atom chain content of at least 50 wt. %; in a ninth sub-embodiment, a $C_{18}$-$C_{22}$ acyl carbon atom chain content of at least 60 wt. %; in tenth sub-embodiment, a $C_{18}$-$C_{22}$ acyl carbon atom chain content of no more than 70 wt. %.

In one embodiment, the fatty acyl mixture is a biologically-derived oil which originates from a biomass source selected from the group consisting of crops, vegetables, microalgae, animal sources and combinations thereof. Those of skill in the art will recognize that generally any biological source of fatty acyl compounds can serve as the biomass from which the biologically-derived oil can be obtained. It will be further appreciated that some such sources are more economical and more amenable to regional cultivation, and also that those sources from which food is not derived may be additionally attractive. Exemplary biologically-derived oils/oil sources include, but are not limited to, canola, castor, soy, rapeseed, palm, coconut, peanut, jatropha, yellow grease, algae, and combinations thereof to meet the composition objectives. In one embodiment, the fatty acyl mixture is a triglyceride wherein the fatty acid groups have two or three different chain lengths to meet the composition objectives. In another embodiment, the fatty acyl mixture is a blend of triglycerides to meet the composition objectives. In yet another embodiment, the fatty acyl mixture is derived from the at least partial hydrolysis of triglycerides to meet the composition objectives.

The hydrolysis, or splitting, of fats/oils to produce fatty acids and glycerol can be achieved by a number of methods: high pressure hydrolysis without a catalyst, medium-pressure autoclave hydrolysis with a catalyst, the ambient pressure Twitchell process with a catalyst, and enzymatic hydrolysis. For more on the hydrolysis of fats/oils see, N. O. V. Sonntag, "Fat Splitting," *J. Am. Oil Chem. Soc.*, 56 (II), 729A-732A, (1979); N. O. V. Sonntag, "New Developments in the Fatty Acid Industry," *J. Am. Oil Chem. Soc.*, 56 (II), 861A-864A, (1979); V. J. Muckerheide, *Industrial Production of Fatty Acids: Fatty Acids; Their Chemistry, Properties, Production and Uses, Part* 4, 2$^{nd}$ ed., Interscience Publishers, 2679-2702 (1967); and M. W. Linfield et al., "Enzymatic Fat Hydrolysis and Synthesis," *J. Am. Oil Chem. Soc.*, 61, 191-195 (1984).

2. Methods: Referring now to FIG. 1, one embodiment of the present invention is directed to a method comprising the steps of: (Step 101) providing a fatty acyl mixture comprising: (i) a $C_{10}$-$C_{16}$ acyl carbon atom chain content of at least 30 wt. % wherein at least 80% of the $C_{10}$-$C_{16}$ acyl carbon atom chains are saturated; and (ii) a $C_{18}$-$C_{22}$ acyl carbon atom chain content of at least 20 wt. % wherein at least 50% of the acyl $C_{18}$-$C_{22}$ carbon atom chains contain at least one double bond; (Step 102) hydrolyzing at least some of the mixture to yield a quantity of $C_{10}$-$C_{16}$ saturated fatty acids and $C_{18}$-$C_{22}$ unsaturated fatty acids; (Step 103) oligomerizing at least some of the $C_{18}$-$C_{22}$ unsaturated fatty acids to yield a quantity of $C_{36+}$ fatty acid oligomers; (Step 104) hydrotreating at least some of the $C_{10}$-$C_{16}$ saturated fatty acids and at least some of the $C_{36+}$ fatty acid oligomers to yield a quantity of diesel fuel blendstock and $C_{36+}$ alkanes; and (Step 105) separating at least some of the diesel fuel blendstock from the $C_{36+}$ alkanes.

In some such above-described method embodiments, there is a sub-step of hydrolysis to yield a quantity of $C_{10}$-$C_{16}$ saturated fatty acids and $C_{18}$-$C_{22}$ unsaturated fatty acids. Such hydrolysis steps are generally consistent with those as described in Section 1.

In some such above-described method embodiments, there is a sub-step of oligomerization to yield a quantity of $C_{36+}$ fatty acid oligomers. While not intending to be bound by theory, the above-described oligomerization is thought to occur via additive coupling reactions between fatty acid components having regions of unsaturation. Such oligomerization can be effected via thermal, catalytic, and/or chemical means. Exemplary catalysts include $SiO_2$—$Al_2O_3$, zeolites, and clays, such as bentonite and montmorillonite. In some such above-described method embodiments, the oligomerized mixture comprises an oligomer component, wherein the oligomer component of the mixture comprises at least about 50 wt. % dimer (dimeric) species (i.e., dimers resulting from the dimerization of unsaturated fatty acid components). Generally, the oligomerization is conducted over a clay catalyst, in the absence of added hydrogen, at a temperature in range of 300° F. to 700° F. (140° C. to 371° C.), at a liquid hourly space velocity in the range of 0.5-10 $h^{-1}$, and at a pressure such that the feed is in the liquid phase. The oligomerization may occur in the presence of added hydrogen provided that a hydrogenating metal catalyst is not present. Methods for the oligomerization of unsaturated fatty acids are well known in the art (see, for example, U.S. Pat. Nos. 2,793,219; 2,793,220; 3,422,124; 3,632,822; and 4,776,983).

In some such above-described method embodiments, there is a sub-step of hydrotreating to yield a quantity of diesel fuel blendstock and $C_{36+}$ alkanes. Hydrotreating removes oxygen from the fatty acids to produce primarily a normal paraffin product. Hydrotreating involves a hydroprocessing/hydrotreating catalyst and a hydrogen-containing environment. In some such embodiments, the active hydroprocessing catalyst component is a metal or alloy selected from the group consisting of cobalt-molybdenum (Co—Mo) catalyst, nickel-molybdenum (Ni—Mo) catalyst, nickel-tungsten (Ni—W) catalyst, noble metal catalyst, and combinations thereof. Such species are typically supported on a refractory oxide support (e.g., alumina or $SiO_2$—$Al_2O_3$). Hydrotreating conditions generally include a temperature in the range of 290° C. to 430° C. and a hydrogen partial pressure generally in the range of 400 pounds-force per square inch gauge (psig) to 2000 psig, typically in the range of 500 psig to 1500 psig. For a general review of hydroprocessing/hydrotreating, see, e.g., Rana et al., "A Review of Recent Advances on Process Technologies for Upgrading of Heavy Oils and Residua," *Fuel*, 86, 1216-1231 (2007). Methods for hydroprocessing triglycerides to yield a paraffinic product are well known in the art (see, for example, U.S. Pat. No. 4,992,605).

In conventional processes, $C_{18+}$ fatty acids are hydrotreated to produce a normal paraffin product. The normal paraffin product derived from $C_{18+}$ fatty acids contributes to pour point problems in diesel fuel. The normal paraffinic product derived from $C_{18+}$ fatty acids can be further isomerized to lower its pour point using an isomerization dewaxing catalyst. In contrast, the methods of the present invention do not require a subsequent isomerization step as the normal paraffin product is derived from $C_{10}$-$C_{16}$ fatty acids which contribute less, to very little, of a pour point problem in diesel fuel. The elimination of a subsequent isomerization step also reduces cost, since that step typically requires a separate catalyst bed and/or a separate reactor. In addition, the $C_{10}$-$C_{16}$ diesel fuel blendstock of the invention can be blended into the diesel pool because the chain lengths are shorter than the normal $C_{18+}$ products such that the cloud point will be low enough to have a reduced negative impact on the cloud point of the pool. By oligomerizing $C_{18+}$ fatty acids, this not only contributes to the production of a valuable base oil product, but also removes those $C_{18+}$ fatty acids from the diesel fuel blendstock, minimizing impact on pour and cloud points.

In some such above-described method embodiments, there is a sub-step of separation of the diesel fuel blendstock and the $C_{36+}$ alkanes. While those of skill in the art will recognize that a variety of separation techniques can be suitably employed, in some such above-described method embodiments the separating step comprises distillation. In one embodiment, the step of distilling employs a distillation column (unit) to separate the $C_{36+}$ alkanes and diesel fuel blendstock into individual fractions. Generally, the $C_{36+}$ alkanes are collected in a high-boiling fraction and the diesel fuel blendstock is collected in a low-boiling fraction. In some particular embodiments, a fractional bifurcation occurs at or around 340° C., in which case the diesel fuel blendstock is largely contained within a 340° C.− fraction (boiling below 340° C.) and the $C_{36+}$ alkanes are contained within a 340° C.+ fraction (boiling above 340° C.). Those of skill in the art will recognize that there is some flexibility in characterizing the high and low boiling fractions, and that the products may be obtained from "cuts" at various temperature ranges.

In one embodiment, the diesel fuel blendstock produced comprises at least 70 wt. % $C_{10}$-$C_{16}$ alkanes; in a second embodiment, at least 80 wt. % $C_{10}$-$C_{16}$ alkanes; in a third embodiment, at least 90 wt. % $C_{10}$-$C_{16}$ alkanes.

The cloud point of the diesel fuel blendstock can be determined by ASTM D2500. In one embodiment, the diesel fuel blendstock has a cloud point of less than −10° C.

In one embodiment, such above-described methods further comprise a step of hydroisomerizing at least some of the $C_{36+}$ alkanes to yield a quantity of base oil blendstock. Generally, the step of hydroisomerizing is carried out using an isomerization catalyst. Suitable such isomerization catalysts can include, but are not limited to Pt or Pd on a support such as, but further not limited to, SAPO-11, SM-3, SM-7, SSZ-32, ZSM-23, ZSM-22; and similar such supports. In some or other embodiments, the step of hydroisomerizing involves an isomerization catalyst comprising a metal selected from the group consisting of Pt, Pd, and combinations thereof. The isomerization catalyst is generally supported on an acidic support material selected from the group consisting of beta or zeolite Y molecular sieves, $SiO_2$, $Al_2O_3$, $SiO_2$—$Al_2O_3$, and combinations thereof. In some such embodiments, the isomerization is carried out at a temperature between 250° C. and 400° C., and typically between 290° C. and 400° C. The operating pressure is generally 200 psig to 2000 psig, and more typically 200 psig to 1000 psig. The hydrogen flow rate is typically 50 to 5000 standard cubic feet/barrel (SCF/barrel). Other suitable hydroisomerization catalysts are disclosed in U.S. Pat. No. 5,300,210, U.S. Pat. No. 5,158,665, and U.S. Pat. No. 4,859,312.

With regard to the catalytically-driven hydroisomerizing step described above, in some embodiments, the methods described herein may be conducted by contacting the product with a fixed stationary bed of catalyst, with a fixed fluidized bed, or with a transport bed. In one presently contemplated embodiment, a trickle-bed operation is employed, wherein such feed is allowed to trickle through a stationary fixed bed, typically in the presence of hydrogen. Illustrations of the operation of such catalysts are disclosed in U.S. Pat. No. 6,204,426 and U.S. Pat. No. 6,723,889.

The viscosity index of the base oil blendstock can be determined by ASTM D2270. In one embodiment, the base oil blendstock has a viscosity index of greater than 120; in a second embodiment, a viscosity index of greater than 130; in a third embodiment, a viscosity index of greater than 140.

The pour point of the base oil blendstock can be determined by ASTM D97. In one embodiment, the base oil blendstock produced has a pour point of less than −10° C.

In one embodiment, the base oil blendstock may be further subjected to an optional hydrofinishing step which generally serves to improve color, and oxidation and thermal stability. In one embodiment, the base oil is utilized as a lubricating base oil blendstock.

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one reference. As used herein, the term "include" and its grammatical variants are intended to be non-limiting, such that recitation of items in a list is not to the exclusion of other like items that can be substituted or added to the listed items. To an extent not inconsistent herewith, all citations referred to herein are hereby incorporated by reference.

What is claimed is:

1. A method comprising the steps of
   a) providing a fatty acyl mixture comprising:
      (i) a $C_{10}$-$C_{16}$ acyl carbon atom chain content of at least 30 wt. % wherein at least 80% of the $C_{10}$-$C_{16}$ acyl carbon atom chains are saturated; and
      (ii) a $C_{18}$-$C_{22}$ acyl carbon atom chain content of at least 20 wt. % wherein at least 50% of the acyl $C_{18}$-$C_{22}$ carbon atom chains contain at least one double bond;
   b) hydrolyzing at least some of the mixture to yield a quantity of $C_{10}$-$C_{16}$ saturated fatty acids and $C_{18}$-$C_{22}$ unsaturated fatty acids;
   c) oligomerizing at least some of the $C_{18}$-$C_{22}$ unsaturated fatty acids to yield a quantity of $C_{36+}$ fatty acid oligomers;
   d) hydrotreating at least some of the $C_{10}$-$C_{16}$ saturated fatty acids and at least some of the $C_{36+}$ fatty acid oligomers to yield a quantity of diesel fuel blendstock and $C_{36+}$ alkanes; and
   e) separating at least some of the diesel fuel blendstock from the $C_{36+}$ alkanes,
   wherein the diesel fuel blendstock of Step e) has a cloud point of less than −10° C.

2. The method of claim 1, wherein the diesel fuel blendstock comprises at least 70 wt. % $C_{10}$-$C_{16}$ alkanes.

3. The method of claim 1, wherein the step of hydrotreating involves a hydroprocessing catalyst and a hydrogen-containing environment.

4. The method of claim 3, wherein the hydroprocessing catalyst is selected from the group consisting of cobalt-molybdenum (Co—Mo) catalyst, nickel-molybdenum (Ni—Mo) catalyst, nickel-tungsten (Ni—W) catalyst, noble metal catalyst, and combinations thereof.

5. The method of claim 1, wherein the separating step comprises distillation.

6. The method of claim 1 further comprising a step of hydroisomerizing at least some the $C_{36+}$ alkanes to yield a quantity of base oil blendstock.

7. The method of claim 6, wherein the step of hydroisomerizing involves an isomerization catalyst comprising a metal selected from the group consisting of Pt, Pd, and combinations thereof.

8. The method of claim 6, wherein the base oil blendstock has a viscosity index of greater than 120.

9. The method of claim 6, wherein the base oil blendstock has a viscosity index of greater than 140.

10. The method of claim 6, wherein the base oil blendstock is utilized as lubricating base oil blendstock.

* * * * *